(12) United States Patent
Malesky, II

(10) Patent No.: US 10,237,627 B2
(45) Date of Patent: *Mar. 19, 2019

(54) SYSTEM FOR PROVIDING AUDIO RECORDINGS

(71) Applicant: AT&T Intellectual Property I, L.P., Atlanta, GA (US)

(72) Inventor: Charles Adam Malesky, II, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 61 days.

This patent is subject to a terminal disclaimer.

(21) Appl. No.: 14/537,607

(22) Filed: Nov. 10, 2014

(65) Prior Publication Data

US 2015/0067740 A1    Mar. 5, 2015

Related U.S. Application Data

(63) Continuation of application No. 12/259,943, filed on Oct. 28, 2008, now Pat. No. 8,886,342.

(51) Int. Cl.
| | |
|---|---|
| *H04N 21/81* | (2011.01) |
| *H04N 21/262* | (2011.01) |
| *H04N 21/24* | (2011.01) |
| *H04N 21/443* | (2011.01) |
| *H04N 21/478* | (2011.01) |
| *H04N 21/233* | (2011.01) |
| *H04N 21/472* | (2011.01) |

(52) U.S. Cl.
CPC ....... *H04N 21/8113* (2013.01); *H04N 21/233* (2013.01); *H04N 21/2407* (2013.01); *H04N 21/26258* (2013.01); *H04N 21/443* (2013.01); *H04N 21/478* (2013.01); *H04N 21/47202* (2013.01)

(58) Field of Classification Search
CPC .......... H04N 21/26258; H04N 21/274; H04N 21/472; H04N 21/8813; H04N 21/4532; H04N 21/4667; H04H 60/27; H04H 60/33; H04H 60/61; H04H 60/74
USPC .................. 700/94; 369/1–12; 704/500–504; 455/3.06
See application file for complete search history.

(56) References Cited

U.S. PATENT DOCUMENTS

| | | | |
|---|---|---|---|
| 6,957,041 B2 | 10/2005 | Christensen et al. | |
| 8,090,619 B1 * | 1/2012 | Hunter | G06Q 20/123 705/26.1 |
| 8,886,342 B2 * | 11/2014 | Malesky, II | H04N 21/2407 700/94 |
| 2003/0046683 A1 | 3/2003 | Jutzi | |

(Continued)

OTHER PUBLICATIONS

Whitepaper—IP Streaming of MPEG-4: Native RTP vs MPEG-2 Transport Stream; Authors: Alex MacAulay, Boris Felts, Yuval Fisher; Oct. 2005.*

(Continued)

*Primary Examiner* — Andrew C Flanders
(74) *Attorney, Agent, or Firm* — Jackson Walker L.L.P.

(57) ABSTRACT

Disclosed systems provide audio recordings from digital television provider networks. Audio recordings are streamed to a customer premises equipment device of a user and, in response to user input, an identifier for the audio recording is transmitted to a music provider. A copy of the audio recording is delivered to a user designated device.

19 Claims, 3 Drawing Sheets

(56) References Cited

U.S. PATENT DOCUMENTS

| | | |
|---|---|---|
| 2003/0097338 A1 | 5/2003 | Mankovich et al. |
| 2004/0266336 A1 | 12/2004 | Patsiokas et al. |
| 2005/0108754 A1 | 5/2005 | Carhart et al. |
| 2005/0287971 A1 | 12/2005 | Christensen et al. |
| 2006/0166740 A1 | 7/2006 | Sufuentes |
| 2007/0130592 A1* | 6/2007 | Haeusel ................ G06F 1/1632 725/81 |
| 2007/0277205 A1 | 11/2007 | Grannan |

OTHER PUBLICATIONS

RTP: A Transport Protocol for Real-Time Applications; Jul. 2003.

* cited by examiner

SYSTEM FOR PROVIDING AUDIO RECORDINGS

The present patent application is a continuation of U.S. patent application Ser. No. 12/259,943, filed Oct. 28, 2008, the entirety of which is hereby incorporated by reference.

BACKGROUND

Field of the Disclosure

The present disclosure generally relates to multimedia content provider networks and more particularly to providing audio recordings.

Description of the Related Art

Multimedia content provider networks may present users access to songs through streaming audio. To acquire a local copy of songs for unlimited play, users may have to visit a brick and mortar retailer to acquire a compact disc or other media that contains the songs.

DESCRIPTION OF THE EMBODIMENT(S)

Figure 1:
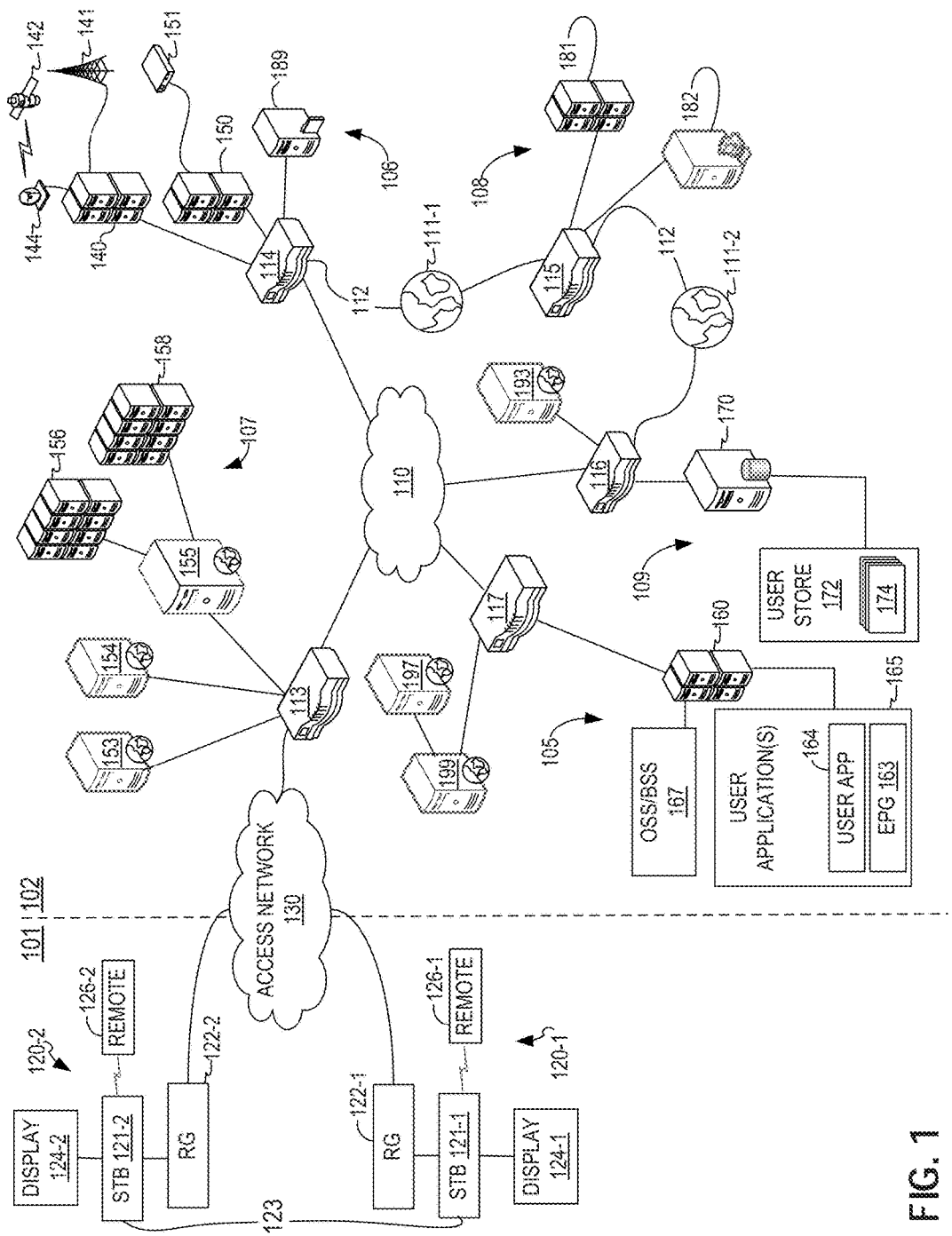
FIG. 1 illustrates a representative Internet Protocol Television (IPTV) architecture for providing audio recordings in accordance with disclosed embodiments.

In one aspect, a method of providing audio recordings includes streaming audio content to a user, receiving a user input to acquire an audio recording included in the audio content, and delivering a copy of the audio recording that is accessible for subsequent on-demand playing to a user designated device. The user designated device may be a personal computer, digital television set-top box (STB), smart phone, or the like. The method may include transmitting an identifier for the audio recording to a music provider and delivering through a delivery server a copy of the audio recording to the user designated device. The delivered audio recording is accessible for subsequent playing and, in some embodiments, is limited to playing only on predetermined devices. For example, the audio recordings may be limited to playing on the device that initially receives the delivered audio recording or limited to playing a predetermined number of times.

The method may further include recording a history of audio recordings listened to by a user, presenting the user with a selectable list of audio recordings that are available for acquisition through a digital television provider network, determining whether a designated device is available, and downloading one or more selected songs to the designated device if it is available. If it is not available, the audio recording may be queued for later delivery. In addition, if there is an interruption in the delivery of the audio recording, the method may include queuing the audio recording for later delivery.

In another aspect, a system for providing audio recordings includes a music streaming subsystem for streaming audio content including a song or other type of audio recording to a customer premises equipment (CPE) device, an interface for receiving a user input to acquire the audio recording, and a delivery subsystem for delivering the requested copy of the audio recording to the CPE or another user device. In some embodiments, the audio recording is in MP3 format or another audio format such as Windows Media Audio (WMA), Advanced Audio Coding, Pulse Code Modulation (PCM), or RealAudio. The system may include a billing subsystem for charging the user a fee for delivering the copy of the audio recording. The user may be associated with an STB or other type of CPE device and the fee may be charged to a digital television account. In some embodiments, the system includes an encoder for encapsulating the audio recording into a series of Moving Picture Experts Group (MPEG) transport stream packets. Encapsulating the audio recording into a series of MPEG transport stream packets may occur at least partially at a real time transport protocol layer. The system may further include a menu subsystem enabled for presenting a history of songs streamed by the user and receiving user input to acquire one or more of the songs.

In still another aspect, computer program product instructions stored on a tangible computer-readable media is enabled for providing audio recordings. The computer program product has instructions for streaming an audio recording to a user's CPE, receiving a user input to acquire the audio recording on a user designated device for subsequent playing, transmitting an identifier for the audio recording to a music provider, and delivering a copy of the audio recording to the user designated device. The delivered audio recording is accessible for subsequent playing and, the streaming audio recording is encoded in H.264 format. In some embodiments, streaming the audio recording includes creating a series of packets that each may include a plurality of MPEG transport stream packets.

In the following description, details are set forth by way of example to enable one of ordinary skill in the art to practice the claimed subject matter without undue experimentation. It should be apparent to a person of ordinary skill that disclosed embodiments are examples and not exhaustive of all possible embodiments. Regarding reference numerals used to describe elements in the figures, a hyphenated form of a reference numeral refers to a specific instance of an element and the un-hyphenated form of the reference numeral refers to the element generically or collectively. Thus, for example, element "121-1" refers to an instance of an STB, which may be referred to collectively as STBs "121" and any one of which may be referred to generically as an STB "121." Before describing other details of embodied methods and devices, selected aspects of multimedia content provider networks that provide multimedia programs are described to provide further context.

Television programs, video on-demand (VOD) movies, audio content, digital television content, music programming, and a variety of other types of multimedia content may be distributed to multiple users (e.g., subscribers) by service providers over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a relatively large number of multimedia content channels (also referred to herein as "channels"), each occupying a different frequency band or channel, through a coaxial cable, a fiber-optic cable, or a combination of the two. The bandwidth required to transport simultaneously large numbers of multimedia channels may challenge cable-based providers. In these types of networks, a tuner within an STB, television, or other form of receiver may be required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies. Instead of being associated with a particular frequency band, an IPTV television program, movie, song, music video, or other form of multimedia content is a packet-based stream that is sent to and from particular network addresses, e.g., IP addresses. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an IP or analogous type of network address that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with an STB, a display, and other appropriate equipment to receive multimedia content from a provider network and convert such content into usable form. In some implementations, a core portion of an IPTV network is implemented with fiber optic cables while the so-called "last mile" may include conventional, unshielded, twisted-pair, cables.

IPTV networks support bidirectional (i.e., two-way) communication between a user's CPE and a service provider's equipment. Bidirectional communication allows a service provider to deploy advanced features, such as VOD, pay-per-view, advanced programming information (e.g., sophisticated and customizable EPGs) menu subsystems for selecting songs for acquisition, and the like. Bidirectional networks may also enable a service provider to collect information related to a user's preferences, whether for purposes of providing preference based features to the user, providing potentially valuable information to service providers, or providing potentially lucrative information to content providers and others.

Referring now to the drawings, FIG. 1 illustrates selected aspects of a multimedia content distribution network (MCDN) 100 for providing audio recordings in accordance with disclosed embodiments. MCDN 100, as shown, is a multimedia content provider network (e.g., a digital television provider network) that may be generally divided into a client side 101 and a service provider side 102 (a.k.a. server side 102). The client side 101 includes all or most of the resources depicted to the left of access network 130 while the server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical wires that connect a subscriber's home or business to a local exchange. In these embodiments, the physical layer of access network 130 may include twisted pair copper cables or fiber optics cables employed as either fiber to the curb (FTTC) or fiber to the home (FTTH).

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a user's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content for reception by users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls (not depicted) that maintain the security and privacy of network 110. Other portions of MCDN 100 communicate over a public network 112, including, for example, the Internet or other type of web network where the public network 112 is signified in FIG. 1 by the World Wide Web icons 111.

As shown in FIG. 1, the client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STBs 121 communicate with server side devices through access network 130 via RGs 122. In addition, as shown, STBs 121 communicate with each other locally or remotely over network 123.

As shown in FIG. 1, RG 122 may include elements of a broadband modem such as a DSL modem, as well as elements of a router and/or access point for an Ethernet or other suitable network 123, which may be a local area network (LAN) or a WAN, as examples. In such embodiments, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using an infrared (IR), RF, or other signal.

In IPTV compliant implementations of MCDN 100, the clients 120 are operable to receive packet-based multimedia streams from access network 130 and process the streams for presentation on displays 124 and/or for play on audio equipment. In addition, clients 120 are network-aware systems that may facilitate bidirectional-networked communications with server side 102 resources to facilitate network hosted services and features. Because clients 120 are operable to process multimedia content streams while simultaneously supporting more traditional web-like communications, clients 120 may support or comply with a variety of different types of network protocols including streaming protocols such as reliable datagram protocol (RDP) over user datagram protocol/Internet protocol (UDP/IP) as well as web protocols such as hypertext transport protocol (HTTP) over transport control protocol (TCP/IP).

The server side 102 of MCDN 100, as depicted in FIG. 1, emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by satellite 142 and received by parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs or other media represented by DVD player 151 or transmitted feeds (not shown). VOD acquisition server 150 may temporarily store multimedia content (e.g., audio content) for transmission to a VOD delivery server 158 in communication with client-facing switch 113.

After acquiring multimedia content, acquisition resources 106 may transmit acquired content over private network 110, for example, to one or more servers in content delivery resources 107. As shown, live acquisition server 140 is communicatively coupled to encoder 189 which, prior to transmission, encodes acquired content using for example, MPEG-2, H.263, MPEG-4, H.264, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video and/or audio streams that are suitable for transmission over private network 110 and/or access network 130. In some embodiments, creating video and/or audio streams from stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by an STB decoder or an audio device (e.g., a stereo).

User requests received by content delivery server 155 may include an indication of the content (e.g., audio recording) that is being requested. In some embodiments, this indication includes an IP address of a music provider associated with the desired content. For example, a particular local broadcast radio station may be associated with a particular channel and the feed for that channel may be associated with a particular IP address. When a user wishes to receive content from the station, the user may interact with remote control device 126 to send a signal to STB 121 indicating a request for the particular channel. When STB 121 responds to the remote control signal, the STB 121 changes to the requested channel by transmitting a request that includes a network address or IP address associated with the desired channel to content delivery server 155.

Content delivery server 155 may respond to such requests by making a streaming video and/or audio signal that is accessible to the user. In the case of multicast, content delivery server 155 employs a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream may be terminated and the user may then receive the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, real-time transport protocol (RTP), real-time control protocol (RTCP), file transfer protocol (FTP), and real-time streaming protocol (RTSP).

In some embodiments, client-facing switch 113 routes multimedia content (e.g., audio content) encapsulated into IP packets over access network 130. For example, an MPEG-2 transport stream may be sent, in which the transport stream consists of a series of 188-byte transport packets. The MPEG-2 transport stream may include video and audio portions of a song or audio recording for processing by an STB in accordance with disclosed embodiments. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide user access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (e.g., user information) for STB 121, for example, because it is connected to an unauthorized twisted pair or RG, client gateway 153 may block transmissions to and from STB 121 beyond the private access network 130.

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an electronic programming guide (EPG) application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that provides a menu with one or more selectable indications of audio recordings. User application 164 is illustrated in FIG. 1 to emphasize the ability to extend the network's capabilities by implementing a network-hosted application. Because the application resides on the network, it generally does not impose any significant requirements or imply any substantial modifications to the client 120 including the STB 121. In some instances, an STB 121 may require knowledge of a network address associated with user application 164, but STB 121 and the other components of client 120 are largely unaffected.

As shown in FIG. 1, a database switch 116 connected to applications switch 117 provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

As shown, MCDN 100 includes delivery server 199, music provider 197, and music server 193. As shown, music server 193 acts as a music streaming subsystem, and delivery server 199 acts as a delivery subsystem of MCDN 100. Music server 193, in accordance with disclosed embodiments, provides MCDN 100 access to a music stream through one or more potential sources including the Internet, live acquisition resources, compact disc recordings, and the like.

As shown in FIG. 1, MCDN 100 includes elements that function as a system for selling audio recordings. A user may receive streamed audio content through access network 130 from music server 193. Delivery server 199 functions as a delivery subsystem for delivering the copy of the audio recording to a CPE device (e.g., STB 121). Music server 193 may provide the streamed audio content with metadata that identifies audio recordings within the streamed audio content. If a user hears an audio recording (e.g., a song or composition) that the user wishes to acquire for later on-demand playing, the user may provide an input (e.g., using remote control device 126) through access network 130 to music provider 197. The user input may be provided through a graphical interface presented on a display (e.g., an EPG on display 124). In some embodiments, the user may be presented with a menu for purchasing audio recordings through a menu subsystem (e.g., user application 164). In some embodiments, the menu subsystem presents the user with a history of songs listened to by the user with selectable indications of audio recordings.

In some embodiments, music provider 197 includes an interface for receiving the user input (or an indication of the user input) to acquire a copy of the audio recording. An identifier for the audio recording that is received as metadata from music server 193 may be provided to delivery server 199 and/or music provider 197. In addition, the user may be presented a history of songs previously listened to by the user. In some embodiments, the user views a history of songs and may make a selection from the history of a song to acquire.

The music stream accessed by music server 193 may be an analog stream or a digital stream. As shown, music server 193 streams audio content including one or more songs or other types of audio recordings to a CPE device such as STB 121-2. In some embodiments, the CPE device may be an electronic device such as a stereo or personal music player (not depicted) that is communicatively coupled to STB 121-2.

Delivery server 199 acts as a delivery subsystem of MCDN 100 to deliver to a CPE device (e.g., STB 121-2) a requested copy of an audio recording. The delivered copy of the audio recording may be in MP3 format or other such format as requested by the user. As shown, OSS/BSS resource 108 includes a billing subsystem for charging the user a fee for delivering the copy of the audio recording. The user may be associated with the CPE (e.g., STB 121-2) by OSS/BSS resource 108. Accordingly, a billing subsystem may charge a fee to a digital television account associated with the user and the CPE. In some embodiments, the billing subsystem may be incorporated into or communicatively coupled to OSS/BSS gateway 167 and subscriber applications 165.

In some embodiments, delivery server 199 acts as or is communicatively coupled to an encoder for encapsulating the audio recording into a series of transport stream packets. In some embodiments, encapsulating the audio recording into a series of transport stream packets occurs at least partially at a real-time transport protocol layer. As shown, EPG application 163 may be enabled as a menu subsystem for presenting to STB 121-2 data that represents a history of songs listened to by a user. Accordingly, remote control device 126-2 may receive user input to acquire a portion of the history of songs previously listened to by the user. For example, a user may use soft buttons that appear on display 124-2 to select for acquisition a portion of the songs appearing in the history. Alternatively, a hard key, for example, labeled "purchase song," or "acquire song" may be incorporated into remote control device 126-2 to allow a user to acquire (e.g., purchase, rent, lease) a song with one push of a button. EPG 163 may also support other menu systems that provide a user with selectable icons or other representations of songs that are available for acquisition. After a user has selected songs, for example, in the history appearing on a menu system for acquisition, delivery server 199 either queues for delivery or immediately delivers the copy of the audio recording requested by the user.

In some embodiments, music provider 197 receives streaming music as an analog stream and delivery server 199 or other components within MCDN 100 act as an encoder for digitizing the analog stream. In addition to digitizing the analog stream, compression and encoding of the digital bit stream may occur. Accordingly, an encoder within MCDN 100 may be enabled for encapsulating the music stream into a series of MPEG transport stream packets. In some embodiments, encapsulating the music stream into a series of MPEG transport stream packets occurs at least partially at a real-time transport protocol layer. In addition, encapsulating the music stream into an MPEG transport stream may occur at least partially at a user datagram protocol layer.

MCDN 100, as shown, includes an OSS/BSS resource 108 including an OSS/BSS switch 115. OSS/BSS switch 115 facilitates communication between OSS/BSS resources 108 via public network 112. The OSS/BSS switch 115 is coupled to an OSS/BSS server 181 that hosts operations support services including remote management via a management server 182. OSS/BSS resources 108 may include a monitor server (not depicted) that monitors network devices within or coupled to MCDN 100 via, for example, a simple network management protocol (SNMP).

Figure 2:
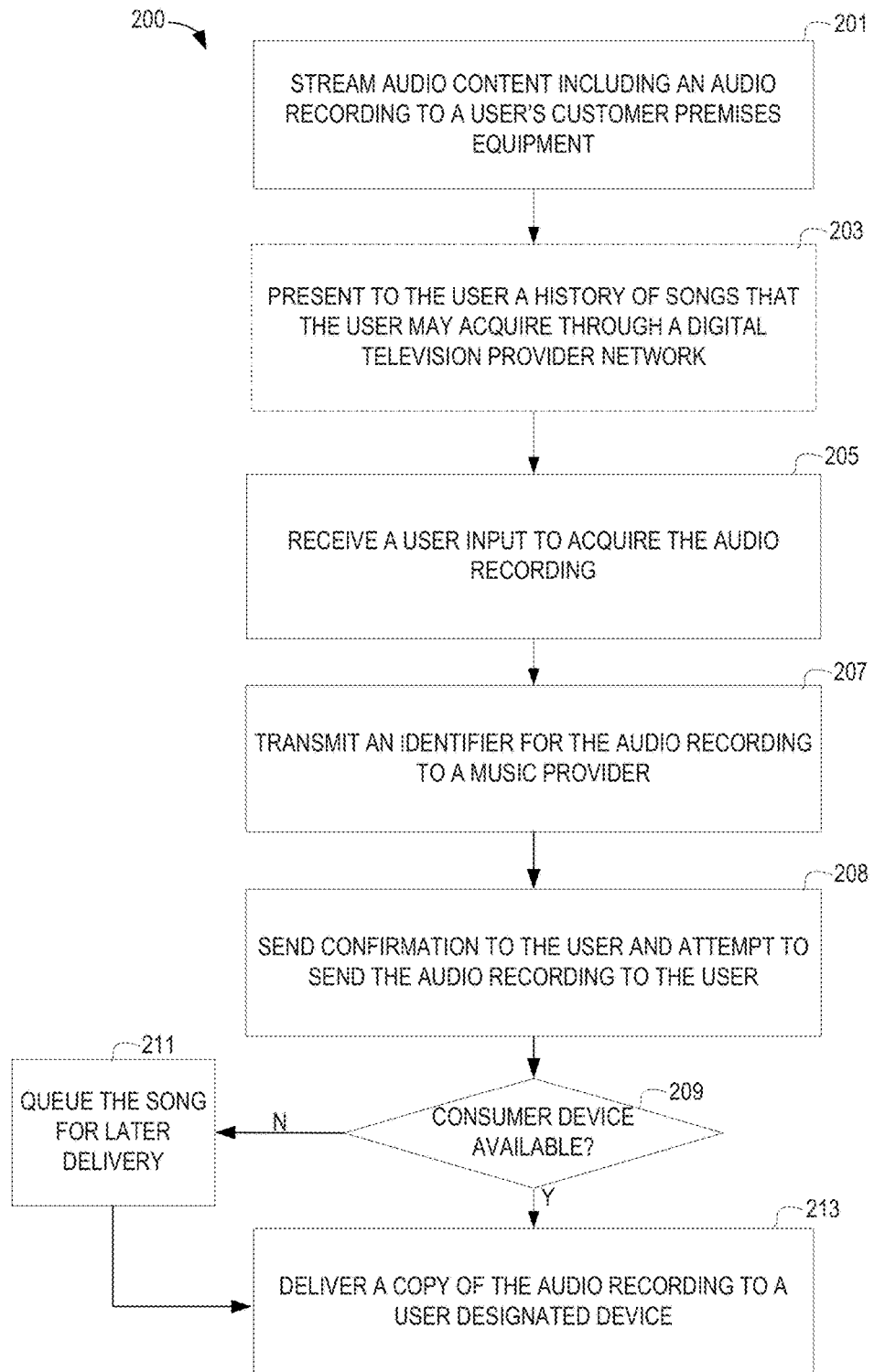
FIG. 2 illustrates selected operations in a methodology for providing audio recordings in accordance with disclosed embodiments.

FIG. 2 depicts selected operations of method 200 for providing audio recordings in accordance with disclosed embodiments. As shown, method 200 includes streaming (block 201) audio content including songs and/or other audio recordings to a user's CPE. The CPE, for example, may be a digital television STB, a personal computer, or a smart phone. In the embodiment depicted in FIG. 2, the user, as an option, is presented (block 203) with a history of songs that are available for acquisition by the user through a digital television provider network. In some cases, a user may tag a song for acquisition while the song is streaming to the user's CPE. In other cases, a user may wish to scroll through recent songs and select a portion of the songs for acquisition. The history of the songs may be presented to the user on a television screen through an EPG that is navigable by inputs to a remote control device used to control an STB in a digital television network. Methodology 200 further includes receiving (block 205) a user input to acquire the audio recording for subsequent playing and transmitting (block 207) an identifier for the audio recording to a music provider. The music provider may be internal to a digital television network provider or the music provider may be an external source that is communicatively coupled to a digital television provider network, for example. As shown, methodology 200 includes sending (block 208) confirmation to the user, attempting (block 208) to send the audio recording to the user, and determining (block 209) whether a customer device (e.g., smart phone or STB) is available for receiving a download of a copy of the audio recording. If the customer device is not available, the song may be queued (block 211) for later delivery. If the customer device is available, the song is delivered (block 213) to a user designated device that is accessible for subsequent playing. The user designated device may be a stereo, STB, a personal computer, car stereo, a PDA, or other such electronic device used for playing and storing music. In some cases, the user designated device may be associated with an Internet-based or other network-based account accessible by the user. In other embodiments, the user designated device may be an e-mail account.

Figure 3:
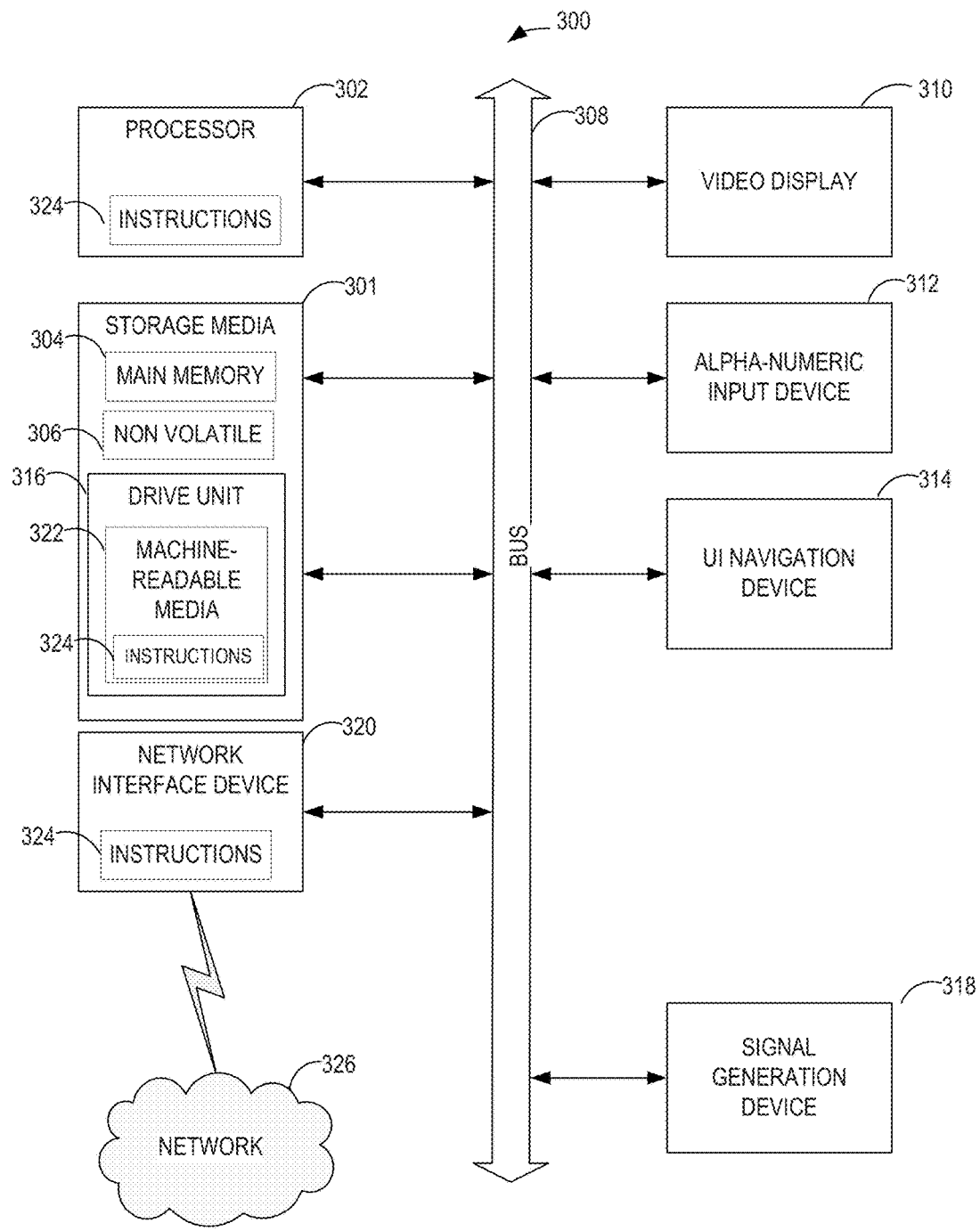
FIG. 3 illustrates a data processing system for use with disclosed embodiments to provide audio recordings.

FIG. 3 illustrates data processing system 300 which includes a processor 302 (e.g., a central processing unit, a graphics processing unit, or both) and storage media 301 that includes a main memory 304 and a non-volatile memory 306, and a drive unit 316 that may communicate with each other via a bus 308. In some embodiments, the main memory 304 and/or the non-volatile memory 306 may be used to store the indicators or values that relate to multimedia content (e.g., audio recordings) accessed or requested by a consumer. Data processing system 300 may further include a video display unit 310 (e.g., a television, a liquid crystal display or a cathode ray tube) on which to display multimedia content such as the presentation of textual information (e.g., song history, song lyrics, title, artist, producer, etc.) for a song, pay-per-view sporting event, television program, VOD movie, and the like. Data processing system 300 also includes an alphanumeric input device 312 (e.g., a keyboard), a user interface (UI) navigation device 314 (e.g., a remote control or a mouse), a signal generation device 318 (e.g., a speaker) and a network interface device 320. The input device 312 and/or the UI navigation device 314 (e.g., the remote control) may include a processor (not shown), and a memory (not shown). The drive unit 316 includes a magnetic or solid state machine-readable medium 322 that may have stored thereon one or more sets of instructions 324 and data structures (not depicted) embodying or utilized by any one or more of the methodologies or functions described herein. The instructions 324 may also reside, completely or at least partially, within the main memory 304, within non-volatile memory 306, within network interface device 320, and/or within the processor 302 during execution thereof by the data processing system 300.

The instructions 324 may be transmitted or received over a network 326 (e.g., a multimedia content provider) via the network interface device 320 utilizing any one of a number of transfer protocols (e.g., broadcast transmissions, HTTP). While the machine-readable medium 322 is depicted as a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine (i.e., data processing system) and that cause the machine to perform any one or more of the methodologies of the present invention, or that is capable of storing, encoding, or carrying data structures utilized by or associated with such a set of instructions. The term "machine-readable medium" shall accordingly be taken to include, but not be limited to, solid-state memories, optical and magnetic media.

In accordance with the disclosed embodiment, instructions 324 are stored on at least one computer readable media and enable data processing system 300 to provide audio recordings. In some embodiments, instructions 324 enable data processing system 300 to stream an audio recording to a user's CPE. Further instructions 324 enable data processing system 300 to receive a user input requesting to acquire the audio recording to enable subsequent playing. Further instructions 324 enable data processing system 300 to transmit an identifier for the audio recording to a music provider and deliver a copy of the audio recording to a user designated device.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed, the scope of the claimed subject matter is to be determined by the broadest permissible interpretation of the following claims and their equivalents, and shall not be restricted or limited by the foregoing detailed description.

What is claimed is:

1. A method of distributing songs, the method comprising:
generating an audio transport stream for one or more songs, wherein the audio transport stream comprises a plurality of 188-byte transport packets;
determining whether a customer device associated with a user is available to receive content wherein the customer device is selected from a group of devices consisting of a set top box and a smart phone;
responsive to determining that the customer device is available to receive content, streaming the one or more songs to the customer device wherein said streaming includes:
encapsulating the audio transport stream within one or more IP packets; and
sending the one or more IP packets to the customer device;
maintaining a song history indicative of songs streamed to the customer device;
providing a song menu identifying songs included in the song history;
receiving user input indicative of a particular song in the song menu; and
downloading a limited-playback copy of the particular song to a user-designated destination, wherein the user-designated destination is selected from a group consisting of a user-designated media playback device and a user-designated email address and wherein a number of times the limited-playback copy may be played back by the user-designated media playback device is limited to a particular number.

2. The method of claim 1, wherein the customer device is the set top box.

3. The method of claim 2, further comprising:
providing an electronic programming guide to the set top box, wherein providing the song menu includes providing the song menu via the electronic programming guide.

4. The method of claim 1, wherein the user-designated media playback device is the set top box.

5. The method of claim 1, wherein the user-designated media playback device is the smart phone.

6. The method of claim 1, wherein the user-designated media playback device is a car stereo device.

7. The method of claim 6, wherein the car stereo device is associated with an Internet-accessible account of the user.

8. The method of claim 1, further comprising:
determining an availability of the user-designated media playback device for receiving content, wherein said downloading occurs responsive to determining the user-designated media playback device is available to receive content; and
queuing the particular song for later delivery responsive to determining the user-designated media playback device is not available.

9. The method of claim 1, further comprising:
including metadata with the limited-playback copy, wherein the metadata identifies the particular song, identifies the user-designated media playback device, and indicates the particular number.

10. A system for distributing audio recordings, the system comprising:
a processor;
a computer readable medium including processor-executable program instructions that, upon execution, cause the processor to perform operations comprising:
accessing an audio transport stream for one or more songs, wherein the audio transport stream comprises a plurality of 188-byte transport packets;
determining whether a customer device associated with a user is available to receive content wherein the customer device is selected from a group of devices consisting of a set top box and a smart phone;
responsive to determining that the customer device is available to receive content, streaming the one or more songs to the customer device wherein said streaming includes:
encapsulating the audio transport stream within one or more IP packets; and
sending the one or more IP packets to the customer device;

maintaining a song history indicative of songs streamed to the customer device;
providing a song menu identifying songs included in the song history;
receiving user input indicative of a particular song in the song menu; and
downloading a limited-playback copy of the particular song to a user-designated destination, wherein the user-designated destination is selected from a group consisting of a user-designated media playback device and a user-designated email address and wherein a number of times the limited-playback copy may be played back by the user-designated media playback device is limited to a particular number.

11. The system of claim 10, wherein the limited-playback copy of the particular song includes metadata and wherein the metadata includes data indicative of the number of times the limited-playback copy of the particular song may be played back by the user-designated media playback device.

12. The system of claim 10, further comprising:
encapsulating the particular song into a series of transport packets.

13. A non-transitory computer readable medium including processor-executable instructions, wherein the processor-executable instructions, when executed by a processor, cause the processor to perform operations comprising:
accessing an audio transport stream for one or more songs, wherein the audio transport stream comprises a plurality of 188-byte transport packets;
determining whether a customer device associated with a user is available to receive content wherein the customer device is selected from a group of devices consisting of a set top box and a smart phone;
responsive to determining that the customer device is available to receive content, streaming the one or more songs to the customer device wherein said streaming includes:
encapsulating the audio transport stream within one or more IP packets; and
sending the one or more IP packets to the customer device;
maintaining a song history indicative of songs streamed to the customer device;
providing a song menu identifying songs included in the song history;
receiving user input indicative of a particular song in the song menu; and
downloading a limited-playback copy of the particular song to a user-designated destination, wherein the user-designated destination is selected from a group consisting of a user-designated media playback device and a user-designated email address and wherein a number of times the limited-playback copy may be played back by the user-designated media playback device is limited to a particular number.

14. The non-transitory computer readable medium of claim 13, wherein the customer device is the set top box.

15. The non-transitory computer readable medium of claim 14, wherein the operations include:
providing an electronic programming guide to the set top box, wherein providing the song menu includes providing the song menu via the electronic programming guide.

16. The non-transitory computer readable medium of claim 14, wherein receiving the user input occurs during streaming of the particular song to the set top box.

17. The non-transitory computer readable medium of claim 14, wherein the user-designated media playback device is the smart phone.

18. The non-transitory computer readable medium of claim 13, wherein the user-designated media playback device is a car stereo device and wherein the car stereo device is associated with an Internet-accessible account.

19. The non-transitory computer readable medium of claim 13, wherein the limited-playback copy of the particular song includes metadata and wherein the metadata includes data indicative of the number of times the limited-playback copy of the particular song may be played back by the user-designated media playback device.

* * * * *